United States Patent [19]

Robert, Jr.

[11] Patent Number: 5,139,144
[45] Date of Patent: Aug. 18, 1992

[54] SOCKET WRENCH STORAGE DEVICE

[76] Inventor: John M. Robert, Jr., 39155 Babin Rd., Gonzales, La. 70737

[21] Appl. No.: 723,309

[22] Filed: Jun. 28, 1991

[51] Int. Cl.⁵ .................. B65D 85/20; B65D 73/00
[52] U.S. Cl. .................. 206/378; 206/493; 70/458
[58] Field of Search ............... 206/378, 375, 336, 493; 70/458; 59/89, 90

[56] References Cited

U.S. PATENT DOCUMENTS

| | | | |
|---|---|---|---|
| 482,670 | 9/1892 | Ackerman | 70/458 |
| 812,458 | 2/1906 | See | 70/458 |
| 1,286,273 | 12/1918 | Gariss | 70/458 |
| 1,286,501 | 12/1918 | Bauer | 70/458 X |
| 1,526,498 | 2/1925 | Jung | 70/458 |
| 1,750,011 | 3/1930 | Kneier | 206/375 |
| 1,979,049 | 10/1934 | Peterson | 206/336 |
| 2,219,721 | 10/1940 | Ingwer et al. | 206/375 |
| 2,432,870 | 12/1947 | Evalt | 70/458 |
| 3,852,982 | 12/1974 | Faris | 70/458 X |
| 4,497,405 | 2/1985 | Mikie et al. | 206/378 |

Primary Examiner—William I. Price
Attorney, Agent, or Firm—Phillips & Beumer

[57] ABSTRACT

A storage device for storage of socket wrenches thereon in end-to-end relation. The device is made of springy material and includes a body having extending arm portions with mutually engageable locking surfaces on the distal ends thereof. The locking action is accomplished as a result of one end member being biased against and retained against the second arm member as a result of the spring action of the material.

12 Claims, 2 Drawing Sheets

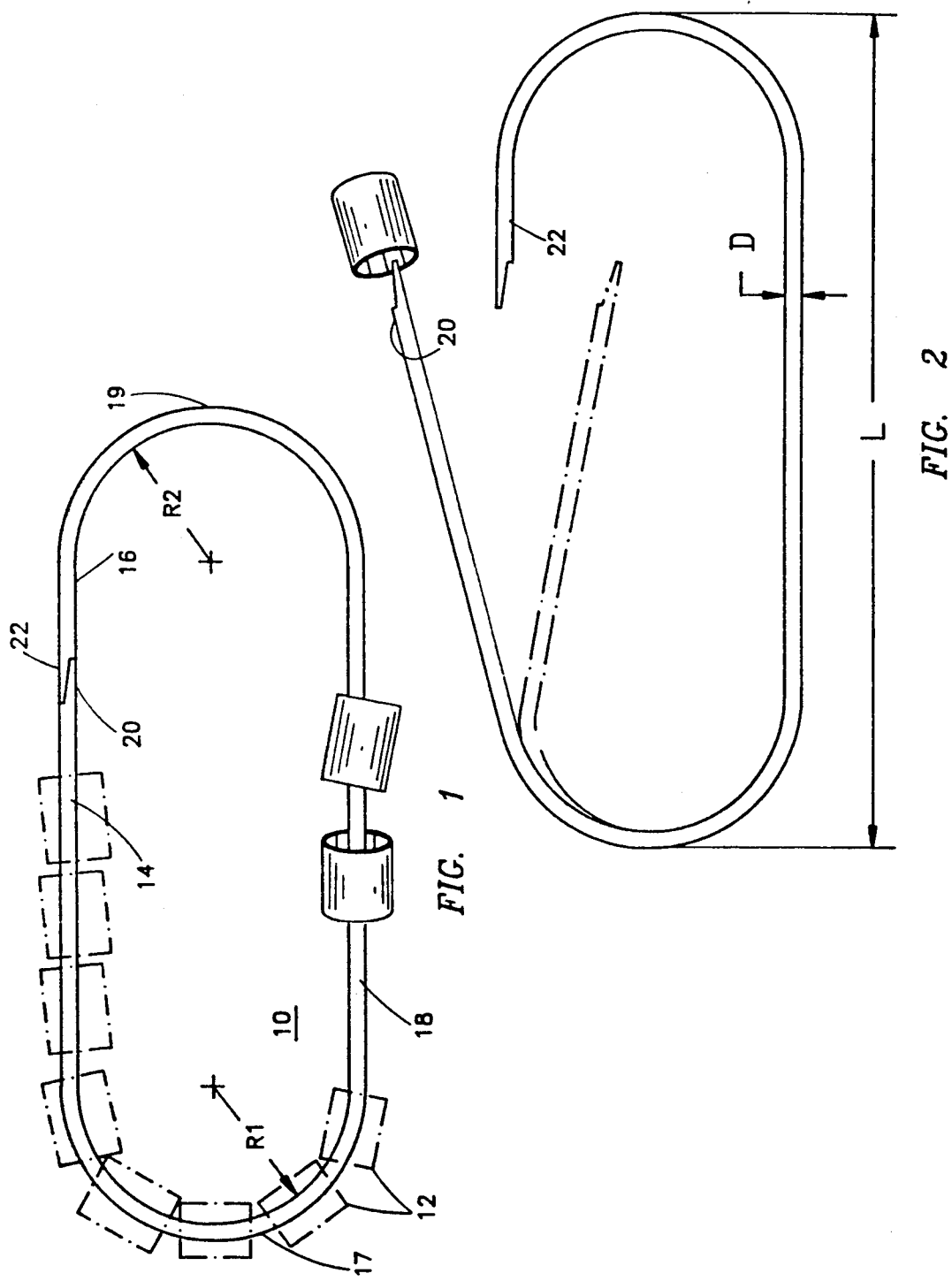

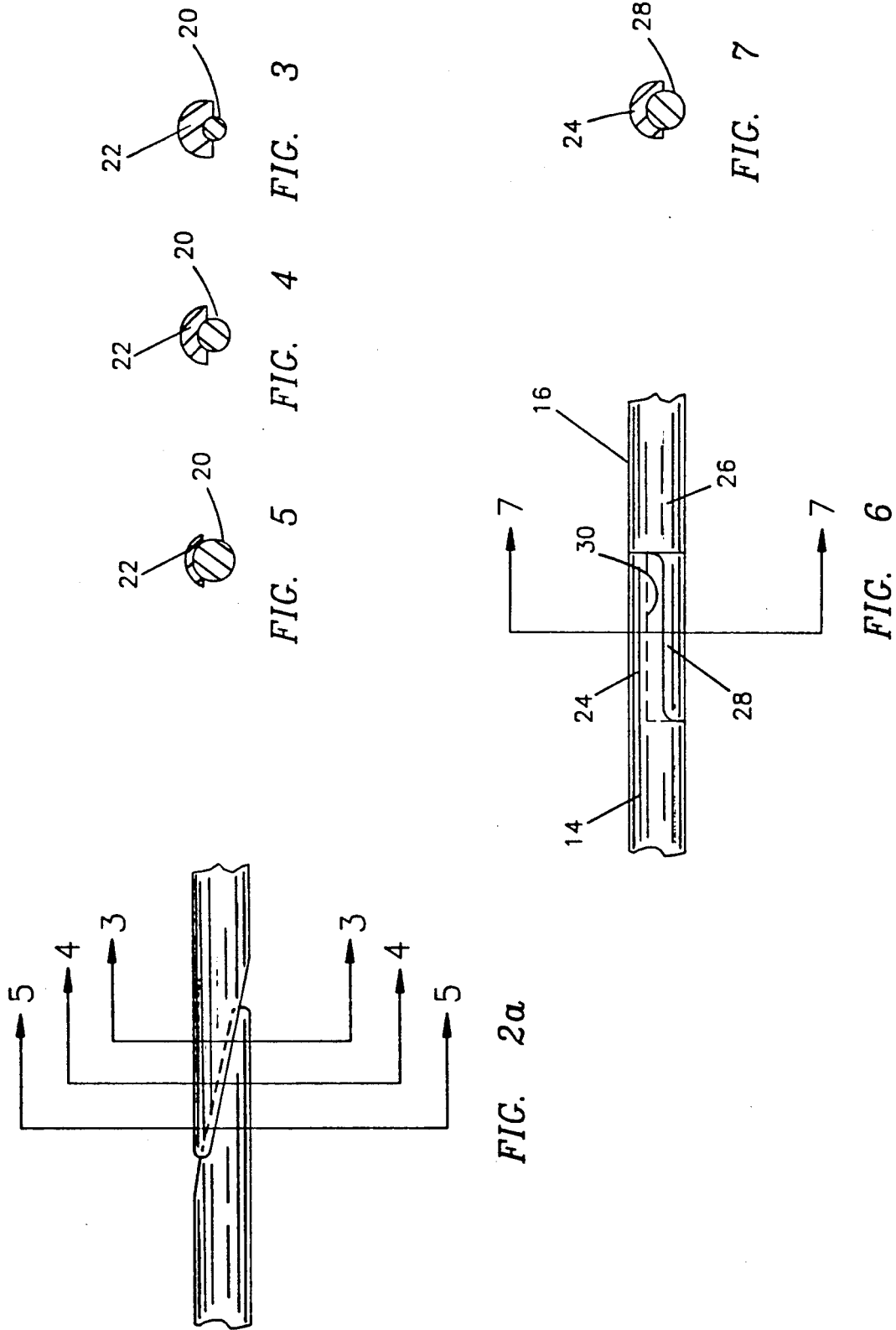

SOCKET WRENCH STORAGE DEVICE

FIELD OF THE INVENTION

This invention relates generally to storage devices having a loop configuration and more particularly to such storage devices for socket wrenches.

BACKGROUND OF THE INVENTION

Storage devices of various configurations for storing various objects are well-known in the art. A storage loop, for example, which serves to package safety pins or the like is disclosed in U.S. Pat. No. 1,979,049, issued to Patterson, on Oct. 30, 1934. The safety pin package is comprised of a ringlike member having a pair of ends which are disposed for abutting end-to-end relation. A separate keeper sleeve is required which emcompasses and retains the ends in abutting relation. A plastic storage loop in the form of a ring is disclosed in U.S. Pat. No. 2,432,870, entitled "Plastic Ring and Method of Making the Same," issued to Evalt, on Dec. 16, 1947, which is used for permanently connecting hotel key tags to room keys. Individual ring segments are cut from a plastic helical coil, and the ends of each segment are secured together, as by gluing, after the key and room tag are assembled to the segment. U.S. Pat. No. 1,286,501, entitled "Lap Ring or Link," issued to Bauer, on Dec. 18, 1918, discloses a storage ring for watch chains or jewelry. The ring includes separate ends each of which are precision machined to include a longitudinally disposed arm having an enlarged extremity provided with a lug extending away from the very end surface of each end portion of the ring. The spacing between the opposed face of one end portion of the arm serves as a receptacle for the lug of the other end portion to provide for interlocking the ends of the ring. As can be seen, such structure requires intricate machining done to very close tolerances. Such required machining operations are time consuming and expensive.

Other loop members are known which serve other than storage purposes. One such loop member is used for attaching a towel to golf bags. This particular device is too small to store any objects thereon and is only useful to receive a grommet attached to the towel or the like thereon. Nor is this device practical as a socket wrench storage device since each of the ends are provided with substantially different radiuses which would prevent socket wrenches from being slid around the end portions without binding. Such sliding movement is necessary for the positioning of a predetermined socket wrench adjacent to the interlocking ends so that a particular selected socket wrench may be removed without the need to remove other socket wrenches from the body of the storage device.

It should be noted that none of the above patents disclose a loop storage member for socket wrenches as described herein having mating end portions which are readily secured together by a radial outwardly biasing force of one end member. Nor does the prior art suggest that such a loop storage member may be particularly useful for storing socket wrenches in an orderly end-to-end fashion thereon, whereby it is only necessary to slide the desired (needed) socket wrench to a position adjacent to the joined ends of the ring member and separate the joined ends of the ring member for removal of the desired socket wrench only, such separation being accomplished by pressing one end portion of the ring storage member radially inwardly by one's hand.

U.S. Pat. Nos. 1,750,011; 2,219,721; and 4,497,405 relate to holders for wrench sockets or the like. However, none of these patents disclose a single member (loop holder) that would allow removal of a specific item from the loop holder without removal of some of the other items.

SUMMARY OF THE INVENTION

A loop or ring-like member for orderly storing a plurality of socket wrenches thereon, to provide for the removal of predetermined ones of the socket wrenches without disturbing the orderly arrangement of the others. A singular loop member is provided for retention of the socket wrenches thereon, and the loop member includes a pair of separate ends disposed in the same circumferential plane. One of the ends terminates radially inwardly of the second end and is biased outwardly for engagement with the inner surface of the second end.

It is an object, therefore, of the present invention to provide a loop member for removably storing a plurality of socket wrenches thereon.

It is a further object of the present invention to provide such structure which will facilitate the orderly removal of predetermined socket wrenches therefrom without the need to remove others from the loop.

It is yet another object of the present invention to provide such loop structure with releasable securing means which will permit the removal and replacement of such socket wrenches in a rapid and facile manner.

BRIEF DESCRIPTION OF THE DRAWINGS

FIG. 1 is an elevational view of the loop member of the present invention in its closed position having a plurality of socket wrenches arranged in orderly fashion thereon.

FIG. 2 is a view similar to FIG. 1 illustrating the loop member of the present invention in its open position for removal of a predetermined socket wrench therefrom.

FIG. 2a is an enlarged elevational view of the connecting ends of the loop.

FIGS. 3, 4, and 5 are sectional views taken, respectively, along lines 3—3, 4—4, and 5—5 of FIG. 2a.

FIG. 6 is an elevational view of another type of securing means for retaining the loop in closed position.

FIG. 7 is a sectional view taken along line 7—7 of FIG. 6.

DESCRIPTION OF THE PREFERRED EMBODIMENT

As seen in FIG. 1, a socket wrench loop storage member includes a body 10 which is provided with an oval configuration and supports a plurality of socket wrenches 12 thereon in orderly fashion (end-to-end relation). Body 10 includes a pair of separate end arm portions 14 and 16 and an intermediate body portion 18. A pair of arcuate portions 17 and 19 having radiuses R1 and R2 join end arm portions 14 and 16 to intermediate body portion 18.

As seen in FIGS. 2-5, end arm portion 14 is provided with a tapered end 20 having a substantially circular cross-sectional configuration, whereas end arm portion 16 is provided with an arcuate end 22 having varying radiuses substantially conforming to the taper and diameter of the circular cross-sectional configuration of end arm portion 14. Such configuration provides for a substantially snug-fitting relation of ends 20 and 22 (as shown in FIGS. 3–5) when the ends 20 and 22 are in engaged relation.

The diameter "D" of the material forming the loop is substantially equal throughout its entire length even in its overlapped closed position. This assures that any socket wrenches or the like may be easily slid around the loop (without binding at the joint or any other point along its surface) until the desired socket is in a position adjacent to the joint and can be easily and selectably removed without having to remove other socket wrenches.

To permit the unrestrained sliding movement of the socket wrenches along the entire length of body 12, it is necessary that R1 and R2 be carefully chosen. If the radiuses are too small, the socket wrenches will bind as they are slid over the arcuate surfaces. In FIGS. 1 and 2, the radiuses R1 and R2 are shown to substantially equal.

FIGS. 6 and 7 illustrate another embodiment of the invention wherein the arm portions 14 and 16 are provided with distal ends 24 and 26 having another type of locking structure. As seen in FIGS. 6 and 7, distal end 24 is provided with a circular cross section having an extending portion 28 which is provided with a smaller circular cross section. Distal end 26 is provided with a substantially circular cut-out complimentary portion 30 to receive extending portion 28 therein for secured relation of the distal ends.

Body 10 is typically made of a springy material which permits it to normally assume the position shown in FIG. 2. when it is in its unrestrained (open) position. The spring action of the material (steel, flexible but stiff plastics, etc.) and the appropriate radius R1 allows the end arm portion 14 including distal end 20 to extend outwardly of end arm portion 16 including distal end 22. In this position, socket wrenches may be loaded on or removed from body 10. Application of a radially inwardly extending pressure (by gripping in the palm of the hand, for example) to end arm portion 14 places end arm portion 14 inwardly of end portion arm 16 (as shown by the dot-dash lines in FIG. 2). Upon releasing the pressure on end arm portion 14, end 20 thereof tends to assume its normal unbiased position and moves outwardly to be "captured" in the inner arcuate surface of end 22 as shown in FIG. 1. Spring action of end arm portion 14 retains the ends 20 and 22 in engaged relation.

In one example of the present invention which has proven to be particularly adaptable to a set of ⅜ socket wrenches, the length dimension "L" of the loop was 7⅜, and the radius of curvature R1 and R2 of the ends was 1⅜. The diameter "X" was 3/16".

It is to be understood that the material may be formed at its engaging ends by machining or stamping, although stamping is the preferred forming method. Furthermore, the material may be made of corrosive-resistant material, or it may be plated or otherwise made corrosion resistant.

It is to be further understood that while a storage loop having an oval (ellipsoidal) configuration is shown and described, the loop may be provided with a more circular configuration, if desired.

While a presently preferred embodiment of the invention has been shown and described with particularity, it is to be understood that various modifications may be resorted to by those skilled in the art that is within the spirit and scope of the invention as set forth in the following claims.

I claim:

1. A socket wrench storage device for storing a plurality of socket wrenches thereon comprising:

a body including a pair of spaced arcuate portions having predetermined radiuses denoted, respectively, as R1 and R2, an intermediate portion joining said arcuate portions and first and second extending end arm portions extending respectively from said first and second arcuate portions, said first and second arm portions having distal ends disposed for interlocking relation, and said body disposed for releasably supporting a plurality of socket wrenches in end-to-end relation thereon; and locking means disposed on said distal ends for releasably secured relation thereof responsive to application of an inwardly directed force to said first extending arm portion which places said first extending ar portion radially inwardly of said second extending arm member, said secured relation of said distal ends being responsive to release of said inwardly directed force on said first extending arm portion whereby said first extending arm member is biased outwardly against said second extending arm member.

2. A device as set forth in claim 1 wherein said loop member is provided with a substantially oval configuration.

3. A device as set forth in claim 2 wherein said locking means is first and second locking means respectively disposed on said distal ends of said first and second extending arm members.

4. A device as set forth in claim 3 wherein said first locking means includes a substantially conically tapered surface disposed on said distal end of said first extending arm member.

5. A device as set forth in claim 4 wherein said second locking means includes an arcuate surface disposed on the inner surface of said distal end of said second extending arm portion.

6. A device as set forth in claim 5 comprised of stiff springy material.

7. A device as set forth in claim 3 wherein said first locking means includes a protruding member having a substantially circular cross section extending from said distal end of said first extending arm portion.

8. A device as set forth in claim 8 wherein said second locking means includes an arcuate cut-out portion disposed on said distal end of said second extending arm portion, said arcuate cut-out portion having a substantially semi-circular surface which is complementary to said protruding member of said first extending arm portion.

9. A device as set forth in claim 1 wherein R1 and R2 are equal.

10. A socket wrench storage device for releasably storing a plurality of socket wrenches thereon comprising:

a body having a substantially loop configuration and first and second interlockably extending end arm portions substantially disposed in a common circumferential plane, said body and said end arm portions disposed for releasably storing a plurality of socket wrenches thereon in end-to-end relation, said end arm portions being provided with distal ends disposed for releasably engaged relation, said body comprised of a springy material which, when unrestrained, assumes a position wherein a first of said end arm portions is displaced radially inwardly of and in substantially the same plane as said second end arm portion; and locking means disposed on said distal ends for releasably secured relation thereof responsive to application of an inwardly directed force to said first extending arm member which places said first extending arm member inwardly of said second extending arm member, said engaged relation of said distal ends being responsive to release of said inwardly directed force to said first extending arm member.

11. A device as set forth in claim 10 wherein said body includes first and second arcuate portions each having one of said extending arm portions extending therefrom, said first and second arcuate portions having predetermined radiuses denoted, respectively, as $R1$ and $R2$.

12. A device as set forth in claim 11 wherein $R1=R2$.

* * * * *